United States Patent
Adibi et al.

(10) Patent No.: US 7,667,882 B2
(45) Date of Patent: Feb. 23, 2010

(54) FOURIER TRANSFORM VOLUME HOLOGRAPHIC SPECTROMETER

(75) Inventors: Ali Adibi, Suwanee, GA (US); Chao Ray Hsieh, Atlanta, GA (US); Arash Karbaschi, Smyrna, GA (US); Omid Momtahan, Smyrna, GA (US)

(73) Assignee: Georgia Tech Research Corp., Atlanta, GA (US)

( * ) Notice: Subject to any disclaimer, the term of this patent is extended or adjusted under 35 U.S.C. 154(b) by 203 days.

(21) Appl. No.: 11/248,866

(22) Filed: Oct. 12, 2005

(65) Prior Publication Data

US 2006/0103904 A1    May 18, 2006

Related U.S. Application Data

(60) Provisional application No. 60/618,436, filed on Oct. 12, 2004.

(51) Int. Cl.
*G02B 5/32* (2006.01)
*G01J 3/28* (2006.01)

(52) U.S. Cl. ............................ 359/15; 356/326; 356/328

(58) Field of Classification Search ................. 356/301, 356/305, 310, 328, 326, 456; 359/15, 29
See application file for complete search history.

(56) References Cited

U.S. PATENT DOCUMENTS

| 5,638,173 | A | * | 6/1997 | Smith et al. | .................. | 356/301 |
| 5,978,112 | A | * | 11/1999 | Psaltis et al. | .................. | 359/22 |
| 6,486,948 | B1 | * | 11/2002 | Zeng | ........................... | 356/301 |
| 7,158,228 | B2 | * | 1/2007 | Psaltis et al. | ................. | 356/326 |

OTHER PUBLICATIONS

"Shift multiplex with spherical reference wave" Appl. Op. 35 (1996) pp. 2403-2417, Barbasathis et al.*

* cited by examiner

*Primary Examiner*—Audrey Y Chang
(74) *Attorney, Agent, or Firm*—Thomas, Kayden, Horstemeyer & Risley, LLP; Todd Deveau

(57) ABSTRACT

One embodiment of a system includes a volume hologram for dispersing a general diffuse beam of light provided as input; a detector for receiving and detecting light dispersed by the volume hologram; and a Fourier transforming lens for forming the Fourier transform of the light dispersed from the volume hologram onto the detector. Other systems and methods are also provided.

17 Claims, 3 Drawing Sheets

200

PROVIDE A VOLUME HOLOGRAM

210

PROVIDE A FOURIER TRANSFORMATION LENS SUCH THAT THE POSITIONING OF THE FOURIER TRANSFORMATION LENS IS IN THE PATHWAY OF A DIFFRACTION BEAM BETWEEN THE VOLUME HOLOGRAM AND THE LIGHT DETECTOR

```
┌─────────────────────────────────────────────┐
│  ILLUMINATE A GENERAL DIFFUSE BEAM OF       │
│  LIGHT UPON A VOLUME HOLOGRAM.              │
│                                         310 │
└─────────────────────────────────────────────┘
                      │
                      ▼
┌─────────────────────────────────────────────┐
│  SEPARATE THE GENERAL DIFFUSE BEAM OF       │
│  LIGHT INTO DIFFERENT WAVELENGTHS HAVING    │
│  DIFFERENT DIRECTIONS                       │
│                                         320 │
└─────────────────────────────────────────────┘
                      │
                      ▼
┌─────────────────────────────────────────────┐
│  PROJECT A FOURIER TRANSFORMATION OF THE    │
│  SEPARATED LIGHT ONTO A DETECTION PLANE     │
│                                         330 │
└─────────────────────────────────────────────┘
```

FOURIER TRANSFORM VOLUME HOLOGRAPHIC SPECTROMETER

CROSS-REFERENCE TO RELATED APPLICATION

This application claims priority to copending U.S. provisional application entitled, "Fourier Transform Volume Holographic Spectrometer," having Ser. No. 60/618,436, filed Oct. 12, 2004, which is entirely incorporated herein by reference.

STATEMENT REGARDING FEDERALLY SPONSORED RESEARCH OR DEVELOPMENT

This invention was made with Government support under Grant No. N01AA23013, awarded by the National Institutes of Health. The Government has certain rights in this invention.

TECHNICAL FIELD

The present disclosure is generally related to optical spectrum measurements and, more particularly, is related to spectrometers

BACKGROUND

Compact and efficient spectrometers are essential for biological and environmental sensing applications in which optical signals of interest are usually very weak and portability is highly desired. Due to their wavelength selectivity, gratings have been used in conventional spectrometers. For example, multiple wavelength channels of a spatially coherent input source can be separated by rotating a grating. For a spatially incoherent source, adding a narrow slit and lens (i.e., to make a collimated beam) in front of the grating is required to avoid the ambiguity between the incident wavelength and the incident angle. However, since most of the input power is blocked by the slit and some space is needed to add the lens, conventional spectrometers are inefficient and bulky.

Thus, a heretofore unaddressed need exists in the industry to address the aforementioned deficiencies and inadequacies.

SUMMARY

Embodiments of the present disclosure provide systems and methods for analyzing an optical spectrum. Briefly described, one embodiment of a system includes a volume hologram for dispersing a general diffuse beam of light provided as input; a detector for receiving and detecting light dispersed by the volume hologram; and a Fourier transforming lens for forming the Fourier transform of the light dispersed from the volume hologram onto the detector.

Embodiments of the present disclosure can also be viewed as providing methods for analyzing an optical spectrum. In this regard, one embodiment of such a method, among others, can be broadly summarized by the following steps: recording a volume hologram such that an illuminating beam of light is separated into a plurality of components; and projecting a Fourier transformation of the separated light onto a detection plane, where positioning of the projection is dependent upon wavelength characteristics of the components.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 is a flow chart describing one embodiment of a method for implementing a Fourier transform SBVH spectrometer.

FIG. 3 is a flow chart describing another embodiment of a method for implementing a Fourier transform SBVH spectrometer.

DETAILED DESCRIPTION

Figure 1:
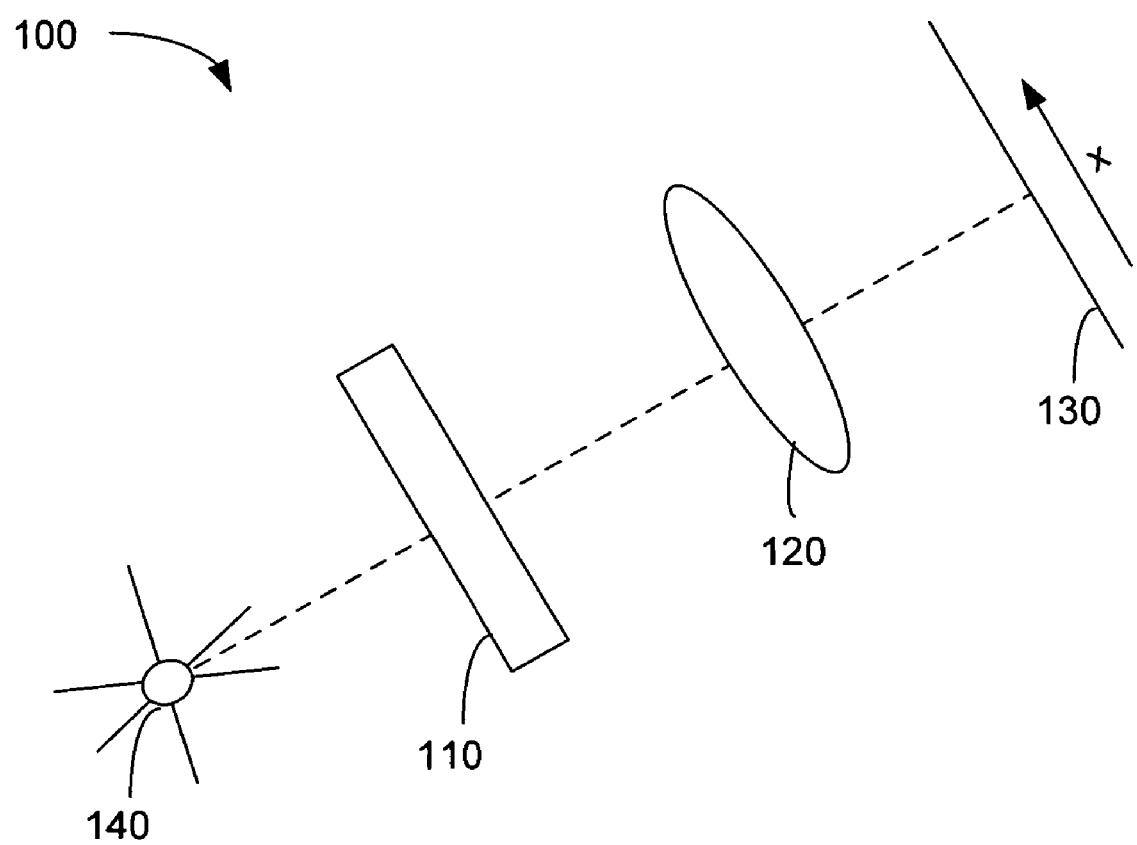
FIG. 1 is a diagram representation of one embodiment of a Fourier transform spherical beam volume hologram (SBVH) spectrometer 100, in accordance with the present disclosure.

FIG. 1 is diagram representation of one embodiment of a Fourier transform spherical beam volume hologram (SBVH) spectrometer 100, in accordance with the present disclosure. The Fourier transform SBVH spectrometer 100 is more compact and generally more efficient compared to conventional spectrometers.

As shown in FIG. 1, the Fourier transform SBVH spectrometer 100 features a volume hologram 110 instead of a conventional grating. Also, the Fourier transform SBVH spectrometer 100 includes an optical Fourier transforming lens 120 positioned in the pathway of a diffracted beam between the volume hologram 110 and detector 130. A light source 140 (i.e., the input optical signal to the spectrometer) is placed in front of the volume hologram 110 and does not require either an entrance slit or a collimating lens for the beam emitted from the light source 140. The spherical beam emitted from the light source 140 is dispersed by the volume hologram 110. Then, the Fourier transform of the diffracted beam (via the Fourier transforming lens 120) is received by the detector 130 (e.g., a CCD (charge coupled device) camera).

By employing a volume hologram 110, the spectrometer 100 of the present disclosure is sensitive to both wavelength and direction of a beam from the light source 140. For example, the characteristics of the volume hologram 110 places components of the light beam having the same wavelength and different directions (e.g., incident angles) into the same area of the detector 130. In particular, in an exemplary embodiment, the Fourier spectrum of the diffracted beam, which is in a shape of a crescent, can be obtained and the position of this crescent only depends on the incident wavelength. The spectrum of the input signal (e.g., light beam) can be retrieved by measuring the position and power of the crescent at the detector. Thus, the ambiguity between incident angle and incident wavelength in a Fourier transform SBVH spectrometer 100 is eliminated by taking the Fourier-transform of the diffracted beam.

With those features, this spectrometer 100 can be used to detect a weak spatially incoherent signal. Because only a Fourier transforming lens 120, a hologram 110, and a detector 130 are required in the system 100, the system's dimension can be reduced to several centimeters squared, and stability can be dramatically improved. In one sense, the collimator (entrance slit and a lens or concave mirror) and wavelength dispersive medium of conventional design is integrated into one single spherical beam volume hologram.

To explain the properties behind the advantageous use of a SBVH 110 with a Fourier transforming lens 120 as a spectrometer, the following discussion is presented. The general shape of a diffracted crescent at the output face of the volume holograph 110 (which, in one embodiment, is recorded at wavelength $\lambda$=532 nm in a sample of Aprilis photopolymer with typical thickness of 100 to 400 $\mu$m) when it is read by a plane wave with wavelength $\lambda_1$ and incident angle $\theta_1$ (between the direction of plane wave and normal to the hologram in air) can be represented as $$g_{\lambda_1\theta_1}(x) = f(x - \Delta(\lambda_1, \theta_1))\exp[j(k_x(\lambda_1)x + \phi_1)], \quad (1)$$

where f(x) represents the shape of the crescent, $k_x(\lambda_1)$ is the component of the propagation vector $k(\lambda_1)$ in the in-plane x direction (the "plane" is formed by the propagation vector of the plane wave and the point source), $\Delta(\lambda_1,\theta_1)$ is the location of the center of the crescent (and it depends on both $\lambda_1$ and $\theta_1$), and $\phi_1$ is a constant phase.

When the volume holograph 110 is read by a diffuse beam at wavelength $\lambda_1$, crescents corresponding to different spatial modes (or different incident plane wave angles $\theta$) exist at different locations $\Delta$. As a result, the diffracted beam has a diffuse pattern resulted from the combination of all these crescents. The diffracted beam in this case (diffuse monochromatic incident beam) can be approximately represented by $$g_{\lambda_1}(x) = \sum_{m=1}^{N} f(x - \Delta(\lambda_1, \theta_m))\exp[j(k_x(\lambda_1)x + \phi_m)], \quad (2)$$

where N is the number of different incident angles $\theta_m$ (or the number of spatial modes) of the incident beam. Note that the direction of propagation of all crescents (i.e., $k_x(\lambda_1)$) only depends on the incident wavelength and not on the incident angle $\theta$]. A more accurate form of Equation (2) can be obtained by replacing $$\sum_{m=1}^{N}$$

with $\int d\theta$ and $\Delta(\lambda_1,\theta_m)$ with $\Delta(\lambda,\theta)$. Taking the Fourier transform of both sides of Equation (2) and calculating the intensity of both sides results in $$|G_\lambda(\omega_x)|^2 = |F(\omega_x - k_x(\lambda))|^2 \left|\sum_{m=1}^{N} \exp[-j(\Delta(\lambda, \theta_m)\omega_x - \phi_m)]\right|^2, \quad (3)$$

where $\omega_x$ represents the spatial frequency variable.

In Equation (3), the ambiguity term $\Delta(\lambda,\theta_m)$ has been transferred into the phase term and the Fourier spectrum of a crescent (i.e., $F(\omega_x)$) is shifted by an amount of $k_x(\lambda)$ which only depends on the incident wavelength and the plane wave used for recording the hologram. The value of the sum of the complex phase terms in Equation (3) depends strongly on the degree of spatial coherence of the incident light source. For spatially coherent light illumination, this term is a complicated function of $\omega_x$ because all phase constant terms $\phi_m$ are correlated. Thus, the Fourier spectrum $|G_\lambda(\omega_x)|^2$ is in general a crescent multiplied by a speckle pattern. On the other hand, all phase constant terms $\phi_m$ are uncorrelated under spatially incoherent (or diffuse) light illumination simplifying Equation (3) to $$|G_\lambda(\omega_x)|^2 = N|F(\omega_x - k_x(\lambda))|^2 \quad (4)$$

By using $\omega_x = x/\lambda f$ for the Fourier transforming lens 120 with focal length f, the output intensity at the Fourier plane (where the detector 140 is placed) can be written as $$H_\lambda(x) = \left|G_\lambda\left(\frac{x}{\lambda f}\right)\right|^2 = N\left|F\left(\frac{x}{\lambda f} - k_x(\lambda)\right)\right|^2 \quad (5)$$

Equations (4) and (5) show that all crescents diffracted by different spatial modes of a monochromatic diffuse input to this spectrometer appear at the same location in the output plane, and these crescents are incoherently added together. Furthermore, the location of the final crescent at the Fourier plane depends only on the incident wavelength $\lambda$ and can be used for spectroscopy.

The Fourier transform volume holographic spectrometer 100 in accordance with the present disclosure has several advantages over conventional spectrometers. First, it does not require any slit and input lens allowing for simpler, lighter, and more compact design. Secondly, it is not sensitive to the input alignment as it works optimally under spatially incoherent light illumination which is useful for diffuse source spectroscopy, especially in biological and environmental sensing applications. For example, one use, among others, for the spectrometer of the present disclosure is in Raman spectroscopy for blood alcohol and glucose content measurement.

Furthermore, by using holograms with more complicated grating structures, the sensitivity of the spectrometer 100 can be further improved. Also, no moving part (i.e., rotation of the hologram 110) is required for limited operation bandwidth (a few hundred nanometers).

Note that the operation spectrum (as well as resolution) can be modified by changing the design parameters such as material thickness and the divergence angle of the recording spherical wave. Further increase in the range of wavelength can be achieved by simply rotating the volume hologram 110.

Further, to make a sophisticated diffraction mechanism, utilizing the volume hologram 110, to get a sophisticated spatial spectral pattern, no complexity is added to the spectrometer design of the present disclosure. All that is needed is more sophisticated equipment at the time of recording the hologram, although the hologram materials are the same in complexity. Therefore, any level of sophistication may be added to the spectrometer 100 of the present disclosure without adding any complexity to the system.

For example, as opposed to a sophisticated grating as used in some conventional systems, the volume hologram 110 is constructed of polymer media. Accordingly, while a conventional grating is often very expensive, a volume holograph 110 may be manufactured at a considerably lower cost. Further, while a conventional grating is also often very thin and very detailed (e.g., 3 to 4 microns in thickness), a volume hologram 110 is significantly more flexible in design with a size of 400 to 500 microns being generally acceptable.

Advantageously, the spectrometer 100 of the present disclosure utilizes the Bragg selectivity of the hologram 110 along with Fourier transformation to separate all acceptable wavelengths at the output.

Advantageously, the performance of the Fourier transform holographic spectrometer 100 can be further improved by using optimal volume holograms that have an optimal holographic pattern (instead of a simple spherical beam volume hologram).

Referring now to FIG. 2, a flow chart describing one embodiment of a method (200) for implementing a Fourier transform SBVH spectrometer is shown. First, in block 210, a volume hologram 110 is provided. A light source 140 may be positioned in front of the volume hologram 110, such that a beam from the light source is transmitted through the volume hologram and diffracted towards a light detector 130 (e.g., CCD). Accordingly, a Fourier transformation lens 120 is also provided (220) such that the positioning of the Fourier transformation lens is in the pathway of the diffracted beam between the volume hologram 110 and the light detector 130.

Referring now to FIG. 3, a flow chart describing another embodiment of a method (300) for implementing a Fourier transform SBVH spectrometer is shown. First, in block 310, a general diffuse beam of light is illuminated upon a volume hologram. Accordingly, the general diffuse beam of light is separated (320) by the volume hologram into different wavelengths having different directions. A Fourier transformation of the separated light is then projected (330) onto a detection plane, where positioning of the projection is dependent upon the wavelength.

Any process descriptions or blocks in flow charts should be understood as representing modules, segments, or portions of code which include one or more steps in the process, and alternate implementations are included within the scope of present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

Therefore, having thus described the invention, at least the following is claimed:

1. A system for analyzing an optical spectrum, comprising:
    a single spherical beam volume hologram recorded by a point source and a plane wave for mapping spectral information of input light into specific spatial output patterns comprising a crescent shape, wherein positioning of the input light is able to be placed at any location in front of the single spherical beam volume hologram to produce the specific spatial output patterns comprising the crescent shape;
    a Fourier transforming lens for forming the Fourier transform of light dispersed from the single spherical beam volume hologram onto a detector; and
    the detector for receiving and detecting light dispersed by the single spherical beam volume hologram and formed by the Fourier transforming lens.

2. The system of claim 1, wherein the system excludes an entrance slit and a lens between a light source providing the input light and the single spherical beam volume hologram.

3. The system of claim 1, wherein the detector comprises a charge coupled device.

4. The system of claim 1, wherein the system excludes a collimator between a light source providing the input light and the single spherical beam volume hologram.

5. The system of claim 1, wherein the Fourier transforming lens projects a Fourier transformation of dispersed light onto the detector.

6. The system of claim 1, wherein dispersed light comprises light of different wavelengths and angular directions.

7. The system of claim 1, wherein the single spherical beam volume hologram has a width greater than 400 microns.

8. The system of claim 1, wherein operation spectrum and resolution of the system is modified solely by changing parameters of the spherical beam volume hologram, the parameters being at least one of size of recording material, direction of the recording plane wave, location of recording point source, and wavelength of recording beams.

9. The system of claim 1, wherein the system is characterized by being insensitive to input alignment.

10. A method of analyzing an optical spectrum, comprising the steps of:
    providing a single spherical beam volume hologram recorded by a point source and a plane wave;
    positioning a light source at any location in front of the single spherical beam volume hologram for mapping spectral information of input light into specific spatial output patterns comprising a crescent shape, such that a beam from the light source is transmitted through the single spherical beam volume hologram and diffracted towards a light detector; and
    providing a Fourier transformation lens such that positioning of the Fourier transformation lens is in the pathway of the diffracted beam between the single spherical beam volume hologram and the light detector.

11. The method of claim 10, wherein the beam is spatially incoherent light.

12. The method of claim 10, wherein the spherical beam volume hologram has a width greater than 400 microns.

13. The method of claim 10, further comprising the step of:
    modifying operation spectrum and resolution characteristics solely by changing parameters of the spherical beam volume hologram, the parameters being at least one of size of recording material, direction of the recording plane wave, location of recording point source, and wavelength of recording beams.

14. The method of claim 10, wherein diffracted light comprises light of different wavelengths and angular directions.

15. A method of analyzing an optical spectrum, comprising the steps of:
    recording a single spherical beam volume hologram using a point source and a plane wave for mapping spectral information of input light into specific spatial output patterns comprising a crescent shape, wherein positioning of the input light is able to be placed at any location in front of the single spherical beam volume hologram to produce the specific spatial output patterns comprising the crescent shape; and
    projecting a Fourier transformation of light dispersed from the single spherical beam volume hologram onto a detection plane, where positioning of the projection is singularly dependent upon wavelength characteristics of components of the input light.

16. The method of claim 15, wherein the single spherical beam volume hologram has a width greater than 500 microns.

17. The method of claim 15, further comprising the step of:

modifying operation spectrum and resolution characteristics solely by changing parameters of the single spherical beam volume hologram, the parameters being at least one of size of recording material, direction of the recording plane wave, location of recording point source, and wavelength of recording beams.

* * * * *